United States Patent
Gold et al.

(10) Patent No.: US 9,595,827 B2
(45) Date of Patent: Mar. 14, 2017

(54) IN-RUSH CURRENT LIMITING SWITCH CONTROL

(71) Applicant: NVIDIA CORPORATION, Santa Clara, CA (US)

(72) Inventors: Spencer Montgomery Gold, Pepperell, MA (US); Karthik Natarajan, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 399 days.

(21) Appl. No.: 14/065,181

(22) Filed: Oct. 28, 2013

(65) Prior Publication Data

US 2015/0116879 A1  Apr. 30, 2015

(51) Int. Cl.
| | |
|---|---|
| H02H 3/08 | (2006.01) |
| H02H 9/02 | (2006.01) |
| H02H 9/04 | (2006.01) |
| H02H 9/00 | (2006.01) |
| G06F 1/26 | (2006.01) |

(52) U.S. Cl.
CPC ............... *H02H 9/04* (2013.01); *G06F 1/26* (2013.01); *H02H 9/002* (2013.01)

(58) Field of Classification Search
CPC .................................. H02H 3/08; H02H 9/04
USPC .................................................. 361/93.1, 93.9
See application file for complete search history.

(56) References Cited

U.S. PATENT DOCUMENTS

2013/0200701 A1* 8/2013 Yuasa ...................... H02J 4/00
307/11

\* cited by examiner

*Primary Examiner* — Dharti Patel
(74) *Attorney, Agent, or Firm* — Artegis Law Group, LLP (57) ABSTRACT

A subsystem is configured to apply a voltage source to a gated circuit domain in a manner that limits in-rush current and affords minimal time delay. A control signal turns on a wake-up switch that connects the voltage source to the domain. The equivalent series resistance of the wake-up switch has a magnitude that limits the transient charge current to the gated domain. A digital control circuit monitors the resulting rising domain voltage and determines when the domain voltage reaches operating level, at which point additional transient current will be minimal. The control circuit then activates a primary switch that connects the voltage source to the domain through a series resistance of negligible magnitude. An adjustment element provides the option to permanently set a control signal that marginally reduces the time at which the control circuit activates the primary switch to compensate for variations in circuit parameters.

23 Claims, 6 Drawing Sheets

IN-RUSH CURRENT LIMITING SWITCH CONTROL

BACKGROUND OF THE INVENTION

Field of the Invention

Embodiments of the present invention relate generally to computer processing and, more specifically, to in-rush current limiting switch control.

Description of the Related Art

In computer systems, in general, and in graphics processing units (GPUs), in particular, functionality is implemented by very-large-scale integrated (VLSI) microcircuits. Within a VLSI microcircuit, functionality is typically partitioned into groups of elements forming circuit domains that perform specific, related operations. Frequently the functionality provided by such a domain is required for only intermittent use. As power consumption within a VLSI microcircuit is a critical parameter, in such a case it is desirable to remove voltage from such a domain when the functionality is not required. One example of such a domain is a random access memory (RAM) that is accessed for a limited period of time and is idle whenever access is not occurring. Often a VLSI microcircuit may include multiple RAMs, and gating voltage to these multiple domains separately, as they are needed, can provide significant power savings. Further, gating of any domain that is used intermittently can provide significant benefit by reducing the power usage of the microcircuit.

Typically a multiplicity of field effect transistors (FETs) performs the switching function that gates the global supply voltage of the microcircuit to the intermittently required circuit domain. FETs function as voltage-controlled resistors. FET resistance is extremely high in cut-off mode, which produces an effective open circuit. In conduction mode, the resistance of the FET is low enough to produce an effective short circuit for the low levels of current involved in data processing within a VLSI microcircuit. However, the bulk resistance of a single FET in conduction mode limits the current that it can pass. As the total domain current is typically very large relative to the bulk resistance of a single FET, very many FETs are connected in parallel to reduce the effective series resistance between the global supply voltage source and the gated domain.

An aspect of this approach is that, when all FETs are switched to conduction mode simultaneously, a large transient current is required to charge the distributed capacitance of the gated domain. This so-called in-rush current causes the supply voltage level to sag while the capacitance of the domain is charging. The resulting decrease in supply voltage imposes a limitation on the operating frequency of the microcircuit, as the maximum frequency of operation is closely correlated to the minimum level of the supply voltage. Because of this, a limited number of the multiplicity of FETs is conventionally switched to conduction mode first. The series resistance provided by the smaller number of parallel FETs provides charging current to the gated domain while limiting the magnitude of the initial transient, or in-rush, current. In this way, turning on a small number of the multiplicity of FETs effects a wake-up function that charges the domain capacitance at a slower rate, thus minimizing the voltage sag. After the domain voltage has charged to a sufficient level, the balance of the multiplicity of FETs are switched to conduction mode to pass the full operating current to the domain circuitry through the resulting very small series resistance.

One drawback to the above approach is that it is uncertain when the domain voltage reaches a sufficient level. The timing of the charge of the domain is dependent on the distributed capacitance of the domain circuitry as well as the bulk resistance of the FETs. Both of these parameters vary due to process differences across a semiconductor wafer and from wafer to wafer. It is possible to delay the turn-on of the full complement of FETs for a fixed amount of time based an analytical estimation the domain capacitance and the equivalent series resistance of the FETs. This approach typically results in an undesirably long interval before the domain is fully powered and guaranteed operational. This extremely long interval degrades system performance by reducing availability. Similarly, an approach that sequentially turns on successive subgroups of FETs after the initial wake-up can also reduce the in-rush current and may accommodate some of the uncertainty but also results in an undesirably long interval.

As the foregoing illustrates, what is needed in the art is a technique for managing in-rush current and turn-on delay.

SUMMARY OF THE INVENTION

One embodiment of the present invention sets forth a computer-implemented method for limiting in-rush current to a gated power domain. The method includes monitoring a voltage applied to the gated power domain over a first time interval, determining that the voltage has exceeded a threshold voltage that is substantially equal to a minimum operating voltage of the gated power domain, and causing the voltage to step to a nominal operating voltage associated with the gated power domain over a second time interval, where the first time interval exceeds the second time interval.

One advantage of the disclosed approach is that the control system is able to turn on the power switch at a time that minimizes the transient, or in-rush, current without causing excessive delay. Further, the switch control operates in a digital mode, thereby dissipating near zero power. Finally, the switch control requires minimal area, which provides a benefit by preserving real estate in the development of the microcircuit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
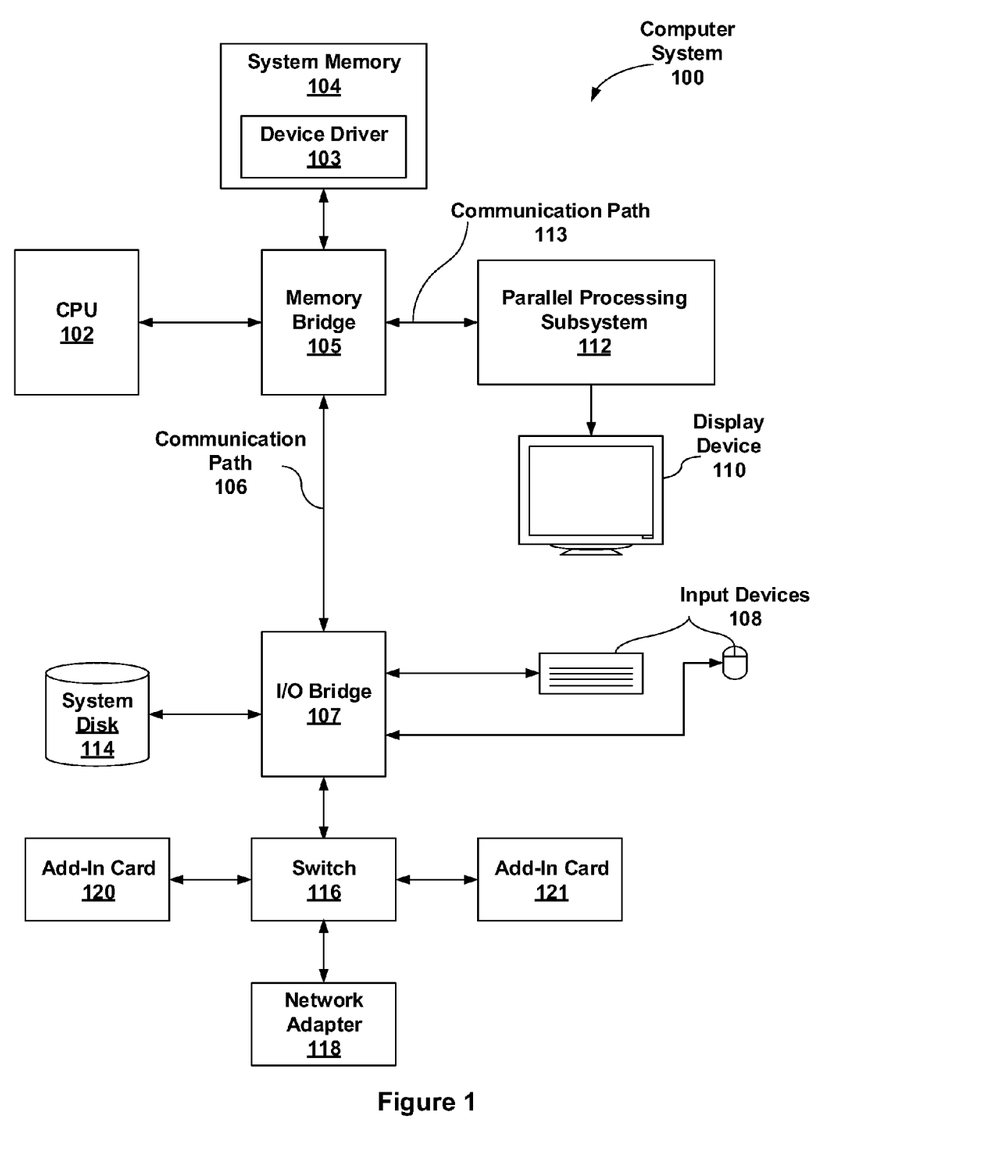
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
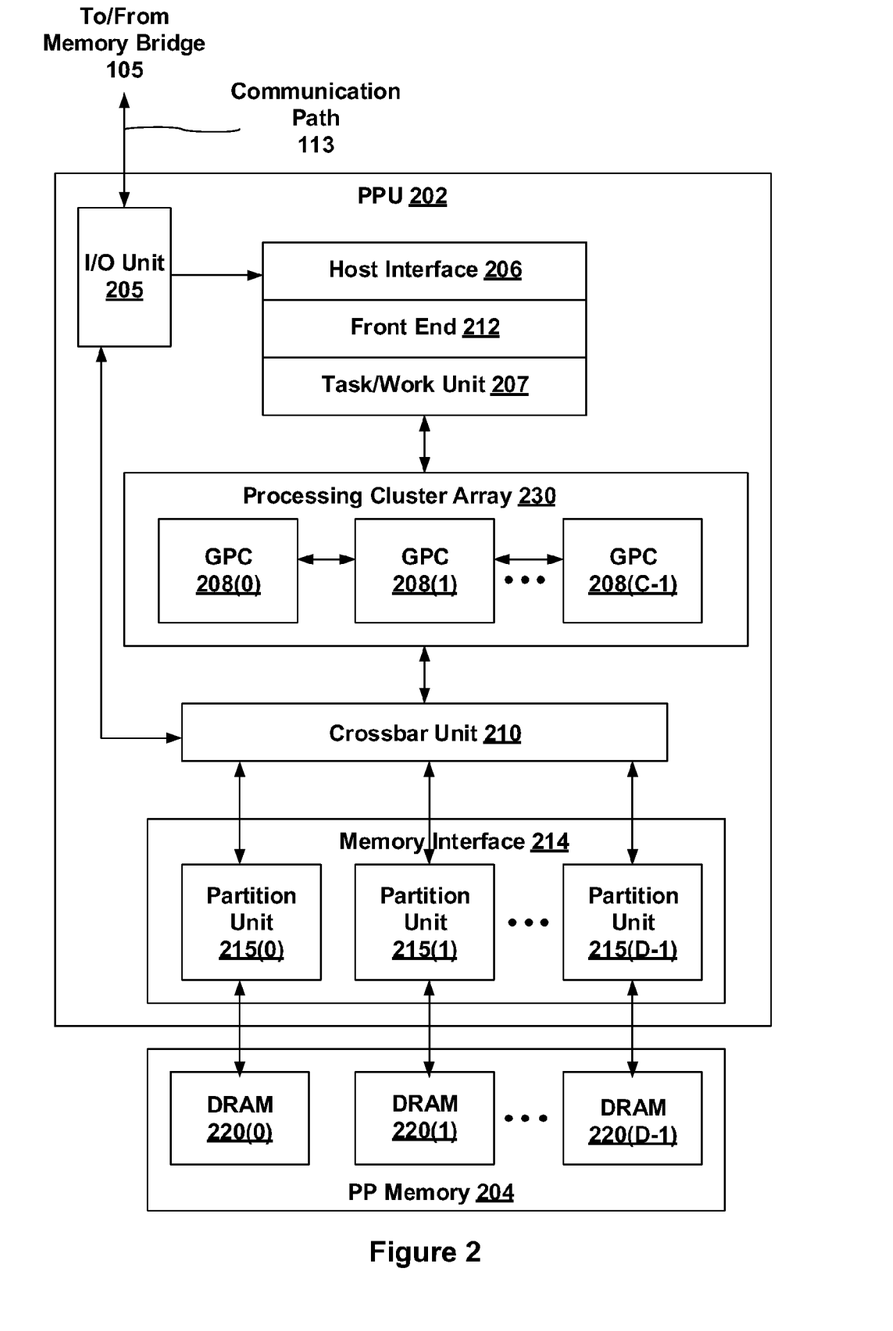
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system on chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

In-Rush Current Limiting Switch Control

Figure 3:
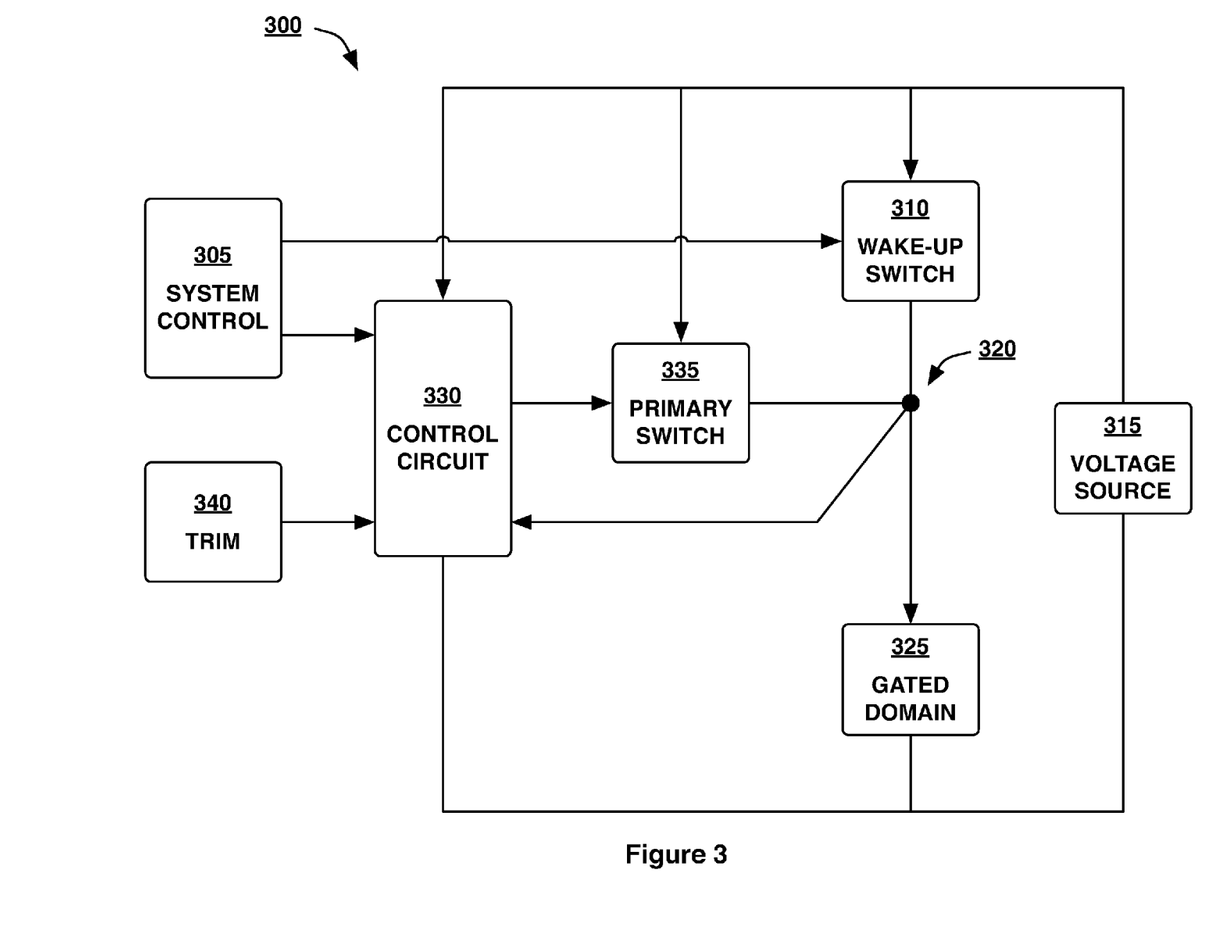
FIG. 3 is a conceptual diagram of a subsystem configured to perform gated power domain switching, according to one embodiment of the present invention.

FIG. 3 is a conceptual diagram of a subsystem 300 configured to perform gated power domain switching, according to one embodiment of the present invention. Subsystem 300 may be included within any portion of computer system 100 of FIG. 1. For example, CPU 102 of FIG. 1 or PPU 202 of FIG. 2 may include one or more instances of subsystem 300. As a general matter, subsystem 300 may be incorporated into any type of computer device, including server machines, desktop machines, laptop computers, mobile devices, handheld devices, and so forth. As described in greater detail herein, subsystem 300 is configured to apply a voltage source to a gated circuit domain in a manner that limits in-rush current and affords minimal time delay. The gated circuit domain could be, for example, a RAM module subject to intermittent usage, a CPU configured to power off when not in use, among other examples of hardware units to which power gating techniques may be applied.

As shown, subsystem 300 includes voltage source 315, wake-up switch 310, primary switch 335, gated voltage 320, and gated domain 325. Subsystem 300 further includes control circuit 330, system control 305, and trim 340.

Gated domain 325 is a group of circuit elements forming a functional block that performs specific, related operations that are needed only at certain limited intervals of time. For example, gated domain 325 could be a random access memory (RAM) that is accessed for a limited period of time and is idle whenever access is not occurring. Voltage source 315 may be an energy source that powers circuitry within the host system or VLSI microcircuit. Voltage source 315 provides power to gated domain 325 through the action of subsystem 300.

Wake-up switch 310 includes a multiplicity of FETs that connect voltage source 315 to gated domain 325 through a series resistance of magnitude that limits the current from voltage source 315 during activation. Gated voltage 320 is the voltage applied to gated domain 325 by the action of wake-up switch 310 and primary switch 335. Control circuit 330 activates primary switch 335 to connect voltage source 315 to gated domain 325. Primary switch 335 typically consists of a multiplicity of parallel FETs that connect voltage source 315 to gated domain 325 through a negligible series resistance.

System control 305 is a logic element that determines when the functionality provided by gated domain 325 is needed and initiates the action of subsystem 300. Trim 340 is a logic element that is used to configure control circuit 330, during a testing phase of subsystem 300, in order to adjust the rise time of gated voltage 320, as further described below.

In operation, if control circuit 330 were to turn on primary switch 335 at a time when gated voltage 320 was at zero volts, the distributed capacitance of gated domain 325 could potentially draw an in-rush of charging current that would cause a droop or sag in the level of voltage source 315. This sag in voltage source 315 could impose a burden on the specification of the operating frequency of the system, as maximum operating frequency is correlated with the minimum supply voltage level. However, to mitigate the potential in-rush current and associated voltage droop, the FETs within wake-up switch 310 provide a source resistance large enough to limit that potential in-rush current. When system control 305 determines that gated domain 325 should be powered on, system control 305 activates wake-up switch 310. Control circuit 330 then monitors the gated voltage 320 applied to gated domain 325 and waits until the level of gated voltage 320 exceeds a "turn-on threshold." When gated voltage 320 exceeds the turn-on threshold, any further residual charging current may cause minimal voltage droop, and primary switch 335 may safely connect voltage source 315 to gated domain 325. With this approach, in-rush current may be limited while maintaining a reasonable turn-on time.

At the time of the first activation of subsystem 300, trim 340 configures the turn-on threshold at which control circuit 330 activates primary switch 335. Such configuration typically occurs during the integration and test phase of the system or microcircuit fabrication. At that time, trim 340 determines if the activation of primary switch 335 has occurred with an acceptable delay. If trim 340 determines that the delay is marginally too long, trim 340 provides a signal to control circuit 330 that marginally reduces the turn-on threshold at which control circuit 330 activates primary switch 335. An example of one technique to implement trim 340 is with a joint action test group (JTAG) system. Trim 340 makes the determination at initial test whether to apply the modification signal, and may store the determined signal state in system memory or may permanently set the resultant signal state with a fusible link.

Figure 4:
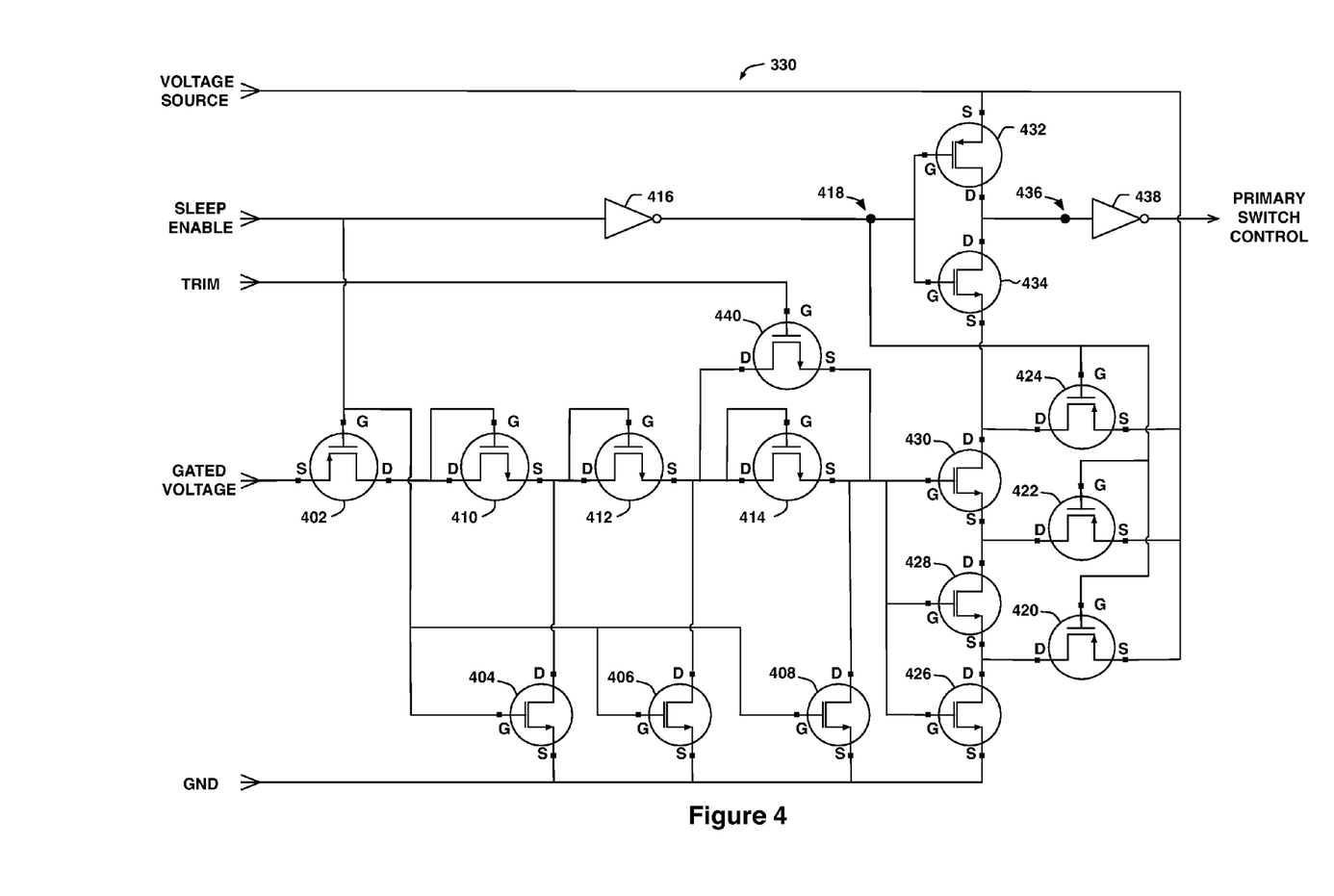
FIG. 4 is a conceptual diagram of a digital control circuit configured to limit in-rush current to the subsystem of FIG. 3, according to one embodiment of the present invention.

FIG. 4 is a conceptual diagram of a digital control circuit 330 configured to limit in-rush current to the subsystem of FIG. 3, according to one embodiment of the present invention. When Sleep Enable is in a high or logic 1 state, it causes inverter 416 to drive node 418 to a low or logic 0 state. A low or logic 0 state at node 418 turns on PFET 432, which drives node 436 high. A high or logic 1 state at node 436 causes inverter 438 output, Primary Switch Control, to go low. Primary switch 320 is, thus, turned off.

In addition, Sleep Enable in a high or logic 1 state turns off PFET 402, which isolates control circuit 330 from gated voltage 320. Further, Sleep Enable in a high or logic 1 state turns on NFETs 404, 406 and 408, which discharge the source nodes of NFETs 410, 412, and 414 respectively. As described above, inverter 416 drives node 418 to a low or logic 0 state. Node 418 in a low or logic 0 state turns on PFETs 420, 422, and 424 which, in turn, charge the drain nodes of NFETs 426, 428, and 430, respectively. Sleep Enable in a high or logic 1 state, thus, establishes idle states for NFETs 410, 412, 414, 426, 428, and 430 that serve as initial conditions when exiting the sleep mode.

System control 305 initiates the transition of Sleep Enable to a low or logic 0 state to begin the wake-up process. The transition of Sleep Enable to a low or logic 0 state causes inverter 416 to drive node 418 high. This turns off upper PFET 432, and, further, turns off PFETs 420, 422, and 424, removing the pre-charge of the drains of NFETs 426, 428, and 430, respectively. At this instant in time, the source of NFET 434 is high. As the gate-source voltage of NFET 434 is zero at this instant, NFET 434 remains cut off, and node 436 remains high by virtue of the stray capacitance of node 436. Inverter 438, therefore, maintains Primary Switch Control in the low state. Primary Switch Control thus maintains primary switch 335 off at this instant.

Further, the transition of Sleep Enable to a low or logic 0 state turns on PFET 402 which connects gated voltage 320 to the series combination of NFETs 410, 412, and 414 and simultaneously turns off NFETs 404, 406, and 408, removing the pre-discharge of NFETs 410, 412, and 414, respectively. The connection of the gate and drain nodes of NFET 410 together causes NFET 410 to function as a diode, the voltage drop of which closely follows the threshold voltage of NFET 410. NFETS 412 and 414 are similarly connected.

In addition to the transition of Sleep Enable to a low or logic 0 state, system control 305 turns on wake-up switch 310, which causes gated voltage 320 to slowly rise. As gated voltage 320 rises, the voltage level through PFET 402 eventually surpasses the voltage drop of the three series, diode-connected NFETs 410, 412, and 414. When the voltage through the three diode-connected NFETs 410, 412, and 414 exceeds the thresholds of NFETs 426, 428, and 430, NFETs 426, 428, and 430 create a path to ground for the source of NFET 434. Consequently, NFET 434 turns on, pulling node 436 to ground. Node 436 going to ground causes inverter 438 to drive the Primary Switch Control signal high, and primary switch 320 turns on.

In summary, wake-up switch 310 turns on and gated voltage 320 begins to rise. After a negligible time interval, sleep enable transitions low. Control circuit 330 monitors gated voltage 320, and when gated voltage 320 rises to a turn-on threshold determined by circuit design parameters, control circuit 330 turns on primary switch 335, thereby completing the turn-on protocol.

Circuit timing depends on the threshold voltages of NFETs 410, 412, and 414, as well as the threshold voltages of NFETs 426, 428, and 430. Threshold voltage is a well controlled parameter, so that determining the time required for gated voltage 320 to reach a level sufficient to turn on NFETs 426, 428, and 430 is accomplished analytically to a reasonable accuracy. Trim 340 input turns on NFET 440, which effectively shorts out NFET 414. The ability to short NFET 414 creates the option of tuning the timing of the circuit to accommodate any residual imprecision in the fabrication of the microcircuit. As mentioned above, trim 340 is typically configured during initial testing of subsystem 330.

When the functionality of gated domain 325 is not required, system control 305 turns off wake-up switch 310 and initiates the transition of Sleep Enable from low to high. As shown above, the transition of Sleep Enable from low to high turns off PFET 402, which isolates the control circuit from, gated voltage 320. Gated voltage 320 then decays at a rate that is not influenced by the control circuit 330. Sleep Enable in a high or logic 1 state initiates the discharge of NFETs 410, 412, and 414 as well as the charge of PFETs 422, 424, and 426. The pre-discharge of NFETs 410, 412, and 414 and the pre-charge of PFETs 422, 424, and 426 establish initial conditions of the circuit that ensure the integrity of the timing protocol when Sleep Enable returns to the low or logic 0 state.

The circuit of FIG. 4 is shown with three diode-connected NFETs (410, 412, and 414) in series, three NFETs (426, 428, and 430) in series to ground, and a single trimming NFET 440. Persons skilled in the art will understand that any number of series diode-connected FETs and any number of series FETs to ground are within the scope of the present invention, and that these numbers need not be the same. Further, any number of trim FETs, effectively shorting out any number of series diode-connected FETs, is also within the scope of the present invention.

Figure 5:
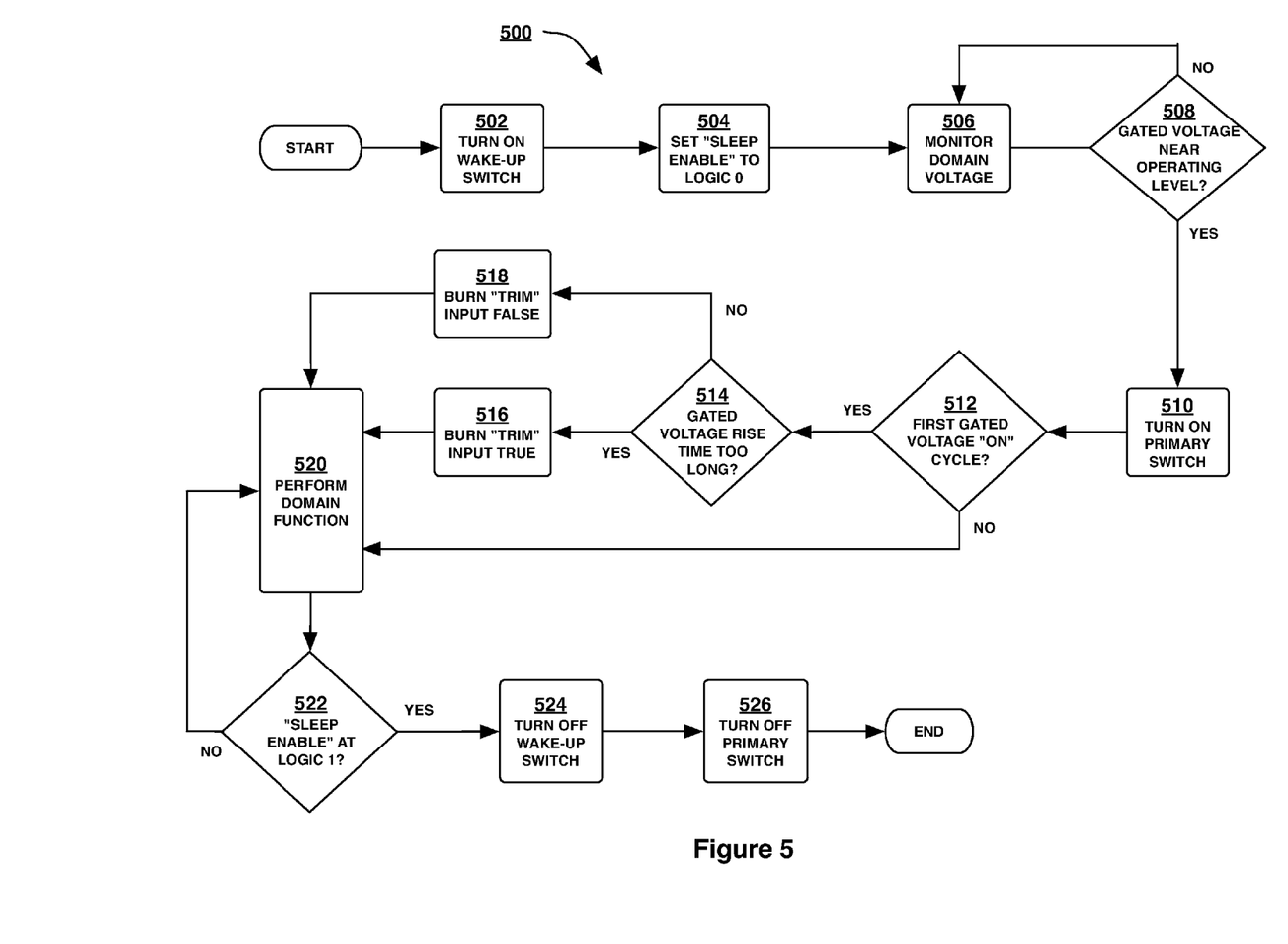
FIG. 5 is a flow diagram of method steps for performing gated power domain switching, according to one embodiment of the present invention.

FIG. 5 is a flow diagram of method steps for performing gated power domain switching, according to one embodiment of the present invention. Although the method steps are described in conjunction with the systems of FIGS. 1-4, persons skilled in the art will understand that any system configured to perform the method steps, in any order, is within the scope of the present invention.

As shown, a method 500 begins at step 502, where, with gated domain 325 unpowered, that is, in sleep mode, system control 305 turns on wake-up switch 310. This causes charging current to flow from voltage source 315 to the distributed capacitance (not shown) of gated domain 325. The magnitude of this charging current is moderate due to the bulk resistance of the limited number of FETs (also not shown) included in wake-up switch 310. In step 504, system control 305 sets the Sleep Enable signal, which is coupled to control circuit 330, to the low or logic 0 condition. Following the transition to low of the Sleep Enable signal, control circuit 330 performs the functionality described in the subsequent method steps.

In step 506, control circuit 330 continuously monitors gated voltage 320 as that voltage rises due to the charging of gated domain 325. In step 508, control circuit 330 determines if gated voltage 320 has charged to near operating level. If control circuit 330 determines that gated voltage 320 is not near operating level, control circuit 330 returns to step 506 where it continues to monitor the level of gated voltage 320. If control circuit 330 determines that gated voltage 320 is near operating level, control circuit 330 proceeds to step 510. In step 510, control circuit 330 turns on primary switch 335. The very low equivalent series resistance of the multiplicity of FETs (not shown) included in primary switch 335 charges gated voltage 320 further to full operating level.

In step 512, trim 340 determines if the rise of gated voltage 320 occurred in a first cycle of power-on. If, in step 512, trim 340 determines that the rise of gated voltage 320 did not occur in a first cycle of power-on, trim 340 proceeds to step 520. In step 520, gated domain 325 performs the domain functionality. At step 522, control circuit 330 determines if system control 305 has transitioned the Sleep Enable signal to the high, or logic 1, state. If, in step 522, control circuit 330 determines that system control 305 has not transitioned the Sleep Enable signal to the logic 1 state, control circuit 330 returns to step 522 where system control 305 continues to perform the domain functionality. If, in step 522, control circuit 330 determines that the Sleep Enable signal has transitioned to the high, or logic 1, state, the control circuit 330 proceeds to step 524. In step 524, system control 305 turns off wake-up switch 310. At step 526, control circuit 330 turns off primary switch 335.

If, in step 512, trim 340 determines that the rise of gated voltage has occurred in a first cycle of power-on, trim 340 proceeds to step 514. At step 514, trim 340 determines if the rise time of gated voltage 320 was too long. If, in step 514, trim 340 determines that the rise time of gated voltage 320 was too long, trim 340 proceeds to step 516. At 516, trim 340 permanently sets the Trim input of control circuit 330 to the high, or logic 1, state. If, in step 514, trim 340 determined that the rise time of gated voltage 320 was not too long, trim 340 proceeds to step 518. At 518, trim 340 permanently sets the trim input to control circuit 330 to the low, or logic 0, state.

Figure 6:
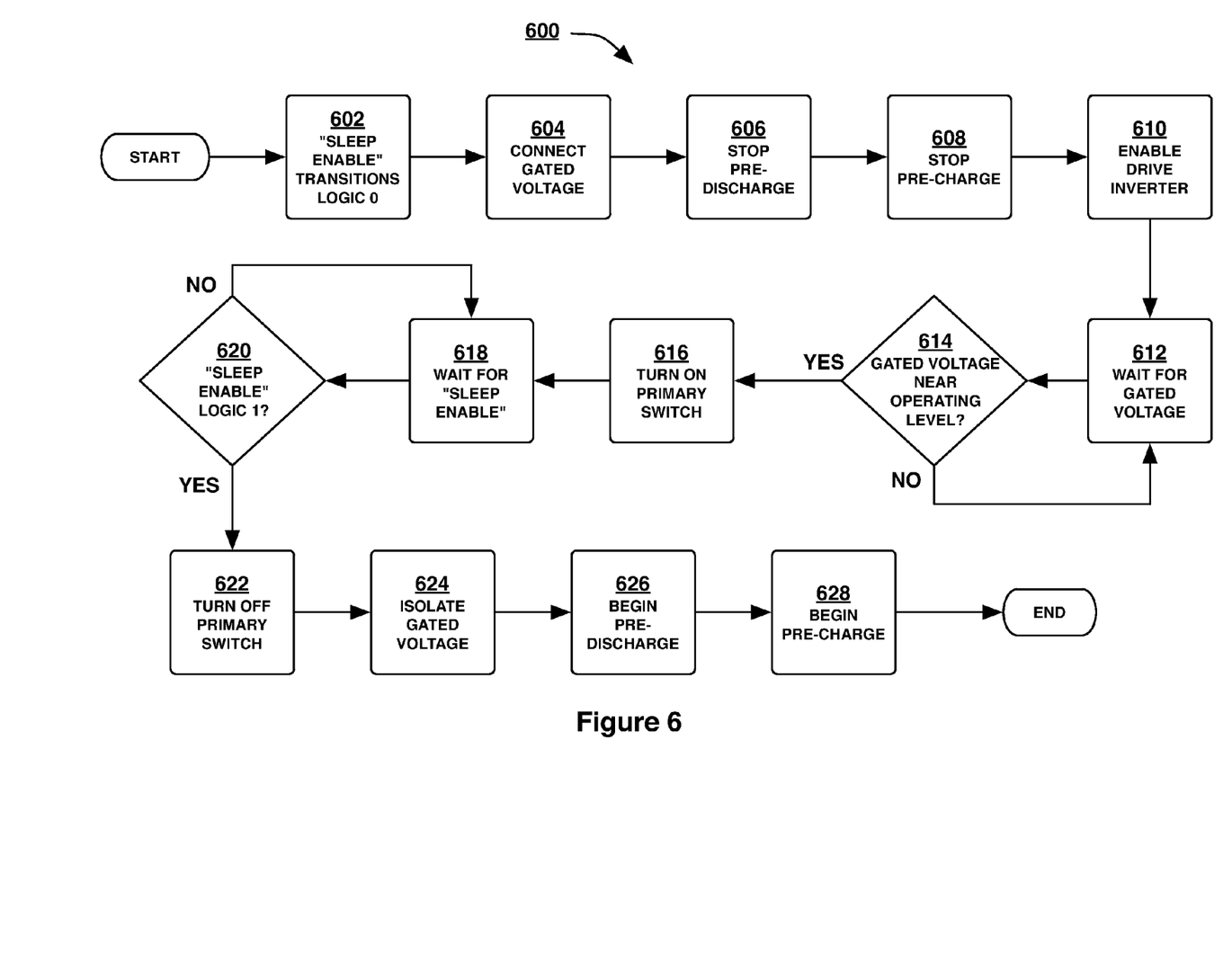
FIG. 6 is a flow diagram of method steps for limiting in-rush current, according to one embodiment of the present invention.

FIG. 6 is a flow diagram of method steps for limiting in-rush current, according to one embodiment of the present invention. Although the method steps are described in conjunction with the systems of FIGS. 1-4, persons skilled in the art will understand that any system configured to perform the method steps, in any order, is within the scope of the present invention.

As shown, a method 600 begins at step 602, where the Sleep Enable input signal of control circuit 330 transitions to a low, or logic 0, state. At step 604, PFET 402 turns on and connects gated voltage 320 to diode-connected NFET 410.

At step 606, NFETs 404, 406, and 408 turn off to stop the pre-discharge of the sources of NFETs 410, 412, and 414, respectively. At step 608, PFETs 420, 422, and 424 turn off to stop the pre-charge of the sources of NFETs 426, 428, and 430, respectively. At step 610, inverter 416 drives node 418 high, which enables NFET 434 to transition low once voltage source 315 rises to near operating level. These steps set the initial conditions that allow control circuit 330 to monitor the rising voltage source 315.

At step 612, control circuit 330 monitors the level of the rising voltage source 315. At step 614, control circuit 330 determines if the level of the rising voltage source 315 is near operating level. If, in step 614, control circuit 330 determines that the level of the rising voltage source 315 is not near operating level, control circuit 330 returns to step 612 where control circuit 330 continues to monitor the level of the rising voltage source 315. If, in step 614, control circuit 330 determines that the level of the rising voltage source 315 is near operating level, control circuit 330 proceeds to step 616. At step 616, NFETs 410, 412, and 414 go into conduction mode, causing NFETs 426, 428, 430 and 434 to turn on. Consequently, node 436 transitions low, causing inverter 438 to drive the Primary Switch Control output of control circuit 330 to go high and turn on primary switch 335. This completes the current limited connection of voltage source 315 to gated domain 325. Control circuit 330 then proceeds to step 618.

At step 618, control circuit 330 waits for the Sleep Enable input signal to transition high, or to logic 1. At step 620, control circuit 330 determines if the Sleep Enable input signal has transitioned high. If, at step 620, control circuit 330 determines that the Sleep Enable input signal has not transitioned high, control circuit 330 returns to step 618 and continues to monitor the Sleep Enable input signal. If, at step 620, control circuit 330 determines that the Sleep Enable input signal has transitioned high, control circuit 330 then proceeds to step 622.

At step 622, inverter 416 drives node 418 low, causing PFET 432 to turn on. This drives the node 436 high, which causes the output of inverter 438 to go low. The Primary Switch Control output signal is then low, which turns off primary switch 335.

At step 624, PFET 402 turns off and effectively isolates gated voltage from diode-connected NFET 410. This removes any loading effect of control circuit 330 from gated voltage 320 and allows gated voltage 320 to discharge at a rate that is not influenced by domain switching subsystem 300. At step 626, NFETs 404, 406, and 408 turn on to begin the pre-discharge of the sources of NFETs 410, 412, and 414, respectively. At step 628, PFETs 420, 422, and 424 turn on to begin the pre-charge of the sources of NFETs 426, 428, and 430, respectively. These steps set and hold the initial conditions that will allow control circuit 330 to monitor the rising voltage source 315 when the Sleep Enable signal transitions to low, or logic 0 in the next cycle of operation.

In sum, a subsystem is configured to apply a voltage source to a gated circuit domain in a manner that limits in-rush current and affords minimal time delay. A control signal turns on an initializing, or wake-up, switch that connects the voltage source to the gated domain. The equivalent series resistance of the wake-up switch has a magnitude that limits the transient charge current to the gated domain. A digital control circuit monitors the resulting rising domain voltage and determines when the domain voltage reaches operating level, at which point additional transient current will be minimal. The control circuit then activates a primary switch that connects the voltage source to the gated domain through a series resistance of negligible magnitude. An adjustment element provides the option to permanently set a control signal that marginally reduces the time at which the control circuit activates the primary switch to compensate for variations in circuit parameters.

One advantage of the subsystems disclosed herein is that the in-rush current to the gated domain is limited to a level that prevents excessive voltage droop of the system voltage source, thus imposing no restriction on the specification of the maximum operating frequency of the system. Further, the subsystem operates in a digital mode and, as such, imposes negligible loading on the host system. In addition, the subsystem requires minimal area. Finally, an adjustment that requires only initial set-up allows compensation for variation in fabrication parameters.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for limiting in-rush current to a gated power domain, the method comprising:
monitoring a voltage applied to the gated power domain over a first time interval;
determining that the voltage has exceeded a threshold voltage; and
causing the voltage to step to a nominal operating voltage associated with the gated power domain over a second time interval.

2. The computer-implemented method of claim 1, wherein determining that the voltage has exceeded the threshold voltage comprises:
coupling the voltage to a series of logic elements, wherein each logic element in the series of logic elements is associated with a different activation threshold; and
determining that the voltage has exceeded a sum of the activation thresholds associated with the series of logic elements.

3. The computer-implemented method of claim 2, wherein the series of logic elements comprises one or more field-effect transistors.

4. The computer-implemented method of claim 1, further comprising:
receiving a sleep enable signal that indicates that the gated power domain should be powered down;
isolating the gated power domain from the nominal operating voltage to allow a residual voltage associated with the gated power domain to decay; and
isolating a series of logic elements from the residual voltage.

5. The computer-implemented method of claim 1, further comprising resetting an operating state associated with a series of logic elements by:
pulling a voltage associated with at least one logic element in the series of logic elements to ground; and
pulling a voltage associated with at least one other logic element in the series of logic elements to the nominal operating voltage.

6. The computer-implemented method of claim 1, further comprising:

determining that the threshold voltage exceeds the nominal voltage level by an incremental amount; and decreasing the threshold by the incremental amount.

7. The computer-implemented method of claim 6, wherein decreasing the threshold voltage by the incremental amount comprises bypassing a first logic element in a series of logic elements.

8. The computer-implemented method of claim 7, wherein the first logic element is associated with an activation threshold that is substantially equal to the incremental amount.

9. The computer-implemented method of claim 1, wherein causing the voltage to step to the nominal operating voltage comprises causing a primary switch to draw an operating current associated with the gated power domain.

10. The computer-implemented method of claim 1, wherein the threshold voltage is substantially equal to a minimum operating voltage of the gated power domain.

11. The computer-implemented method of claim 1, wherein the first time interval exceeds the second time interval.

12. A subsystem, comprising:
a voltage source; and
a control circuit coupled to the voltage source and configured to:
monitor a voltage applied to the gated power domain over a first time interval,
determine that the voltage has exceeded a threshold voltage that is substantially equal to a minimum operating voltage of the gated power domain, and
cause the voltage to step to a nominal operating voltage associated with the gated power domain over a second time interval.

13. The subsystem of claim 12, wherein the control circuit is configured to determine that the voltage has exceeded the threshold voltage by:
coupling the voltage to a series of logic elements, wherein each logic element in the series of logic elements is associated with a different activation threshold; and
determining that the voltage has exceeded a sum of the activation thresholds associated with the series of logic elements.

14. The subsystem of claim 13, wherein the control circuit is further configured to:
receive a sleep enable signal that indicates that the gated power domain should be powered down;
isolate the gated power domain from the nominal operating voltage; and
isolate the series of logic elements from the residual voltage.

15. The subsystem of claim 12, wherein the control circuit is configured to reset an operating state associated with a series of logic elements by:
pulling a voltage associated with at least one logic element in the series of logic elements to ground; and
pulling a voltage associated with at least one other logic element in the series of logic elements to the nominal operating voltage.

16. The subsystem of claim 15, wherein the series of logic elements comprises one or more field-effect transistors.

17. The subsystem of claim 12, wherein the control circuit is further configured to:
determine that the threshold voltage exceeds the nominal voltage level by an incremental amount; and
decrease the threshold by the incremental amount.

18. The subsystem of claim 17, wherein the control circuit decreases the threshold voltage by the incremental amount by bypassing a first logic element in the series of logic elements.

19. The subsystem of claim 18, wherein the first logic element is associated with an activation threshold that is substantially equal to the incremental amount.

20. The subsystem of claim 12, wherein the control circuit causes the voltage to step to the nominal operating voltage by causing a primary switch to draw an operating current associated with the gated power domain.

21. The subsystem of claim 12, wherein the first time interval exceeds the second time interval.

22. A computing device, comprising:
a memory; and
a processor coupled to the memory and including a control circuit, wherein the control circuit is configured to:
monitor a voltage applied to the gated power domain over a first time interval,
determine that the voltage has exceeded a threshold voltage that is substantially equal to a minimum operating voltage of the gated power domain, and
cause the voltage to step to a nominal operating voltage associated with the gated power domain over a second time interval, wherein the first time interval exceeds the second time interval.

23. The computing device of claim 20 wherein the control circuit is configured to determine that the voltage has exceeded the threshold voltage by:
coupling the voltage to a series of logic elements, wherein each logic element in the series of logic elements is associated with a different activation threshold; and
determining that the voltage has exceeded a sum of the activation thresholds associated with the series of logic elements.

* * * * *